US007227571B2

(12) United States Patent
Katoh

(10) Patent No.: US 7,227,571 B2
(45) Date of Patent: Jun. 5, 2007

(54) COLOR REPRODUCTION CORRECTOR FOR IMAGE INPUT DEVICE AND COLOR REPRODUCTION CORRECTION METHOD

(75) Inventor: Naoya Katoh, Chiba (JP)

(73) Assignee: Sony Corporation, Tokyo (JP)

( * ) Notice: Subject to any disclaimer, the term of this patent is extended or adjusted under 35 U.S.C. 154(b) by 1049 days.

(21) Appl. No.: 10/169,417

(22) PCT Filed: Oct. 17, 2001

(86) PCT No.: PCT/JP01/09113

§ 371 (c)(1),
(2), (4) Date: Nov. 13, 2002

(87) PCT Pub. No.: WO02/37863

PCT Pub. Date: May 10, 2002

(65) Prior Publication Data

US 2003/0113014 A1   Jun. 19, 2003

(30) Foreign Application Priority Data

Oct. 31, 2000   (JP)   ............................. 2000-332972

(51) Int. Cl.
*H04N 9/73* (2006.01)
*G06K 9/00* (2006.01)
(52) U.S. Cl. .................... 348/223.1; 348/655; 382/167
(58) Field of Classification Search ............. 348/223.1, 348/225.1, 655, 658; 358/516, 518, 523; 382/167
See application file for complete search history.

(56) References Cited

U.S. PATENT DOCUMENTS 6,243,133 B1 * 6/2001 Spaulding et al. ........ 348/223.1

(Continued)

FOREIGN PATENT DOCUMENTS

EP   0 891 077   1/1999

(Continued)

OTHER PUBLICATIONS

Abe et al.; "A Method to Estimate Correlated Color Temperatures of Illuminants Using a Color Video Camera"; Feb. 1991; IEEE Transactions on Instrumentation and Measurement; vol. 40, No. 1; pp. 28-33.*

(Continued)

*Primary Examiner*—John M. Villecco
(74) *Attorney, Agent, or Firm*—Frommer Lawrence & Haug LLP; William S. Frommer

(57) ABSTRACT

The present invention has an object to provide a color reproduction correcting device for image input apparatus capable of excellently reproducing colors without difficulties, even when an image is reproduced under an observation light source that is different from an image pick-up light source in terms of color rendering. The present invention has white balance matrix production means 130 that receives chromaticity point data from the image input apparatus to produce a correction matrix for white balance, light source type determination means 140 that receives information on the image pick-up light source from the image input apparatus to determine the types of the image pick-up light source and an image color reproduction light source, transformation matrix production means 150 that produces a transformation matrix reflecting the optical characteristics of the picked-up object by using predetermined color matching function data, spectral characteristic data regarding the image pick-up light source and color reproduction light source, of the types determined by the light source type determination means 140, optical characteristics data on a predetermined picked-up object, and correction matrix data for white balance, and color correction processing means 170 that performs color reproduction correction with respect to the image data using the transformation matrix.

16 Claims, 8 Drawing Sheets

U.S. PATENT DOCUMENTS

| | | | |
|---|---|---|---|
| 6,459,449 B1* | 10/2002 | Juen | 348/223.1 |
| 6,466,334 B1* | 10/2002 | Komiya et al. | 358/501 |
| 6,618,079 B1* | 9/2003 | Higuchi | 348/223.1 |
| 7,002,623 B1* | 2/2006 | Ohyama et al. | 348/225.1 |
| 7,002,624 B1* | 2/2006 | Uchino et al. | 348/225.1 |
| 7,010,161 B2* | 3/2006 | Kanai | 382/167 |
| 7,061,646 B2* | 6/2006 | Fukasawa | 358/518 |
| 7,146,041 B2* | 12/2006 | Takahashi | 382/167 |
| 7,158,174 B2* | 1/2007 | Gindele et al. | 348/223.1 |
| 2002/0008762 A1* | 1/2002 | Takemoto | 348/223 |
| 2002/0196972 A1* | 12/2002 | Bayramoglu et al. | 382/167 |

FOREIGN PATENT DOCUMENTS

| | | | |
|---|---|---|---|
| JP | 07030916 A | * | 1/1995 |
| JP | 9 214787 | | 8/1997 |
| JP | 10108031 A | * | 4/1998 |
| JP | 10173941 A | * | 6/1998 |
| JP | 10 191378 | | 7/1998 |

OTHER PUBLICATIONS

Qian et al.; "An Automatic Light Spectrum Compensation Method for CCD White Balance Measurement"; May 1997; IEEE Transactions on Consumer Electronis; vol. 43, No. 2; pp. 216-220.*

* cited by examiner

COLOR REPRODUCTION CORRECTOR FOR IMAGE INPUT DEVICE AND COLOR REPRODUCTION CORRECTION METHOD

TECHNICAL FIELD

The present invention relates to a color reproduction correcting device and a color reproduction correcting method for an image input apparatus. Particularly, the invention relates to a color reproduction correcting device and method therefor to reproduce colors of the image at a desired level of color rendition under the same visual environment or under a different visual environment.

BACKGROUND ART

Conventionally, it is known that an image picked up by an image input apparatus such as a camera is differently viewed depending on a visual environment at the time of observation, and there are cases where images are not reproduced with desired colors. This occurs when the color rendition under a light source at the time of image pick-up (hereinafter referred to as "the image pick-up light source") and the color rendition under a light source at the time of observation (hereinafter referred to as "the observation light source") greatly differ from each other, and so on. For example, when the image picked up under a D65 light source of a sunlight type has been observed under an F5 light source of a high-efficiency fluorescent lamp type, the reproduced colors greatly differ from each other.

Further, it is known that color reproduction can be excellently made between light sources of the same type by performing correction called "white balance" to reproduce a white color of the picked-up image as it is. Here, needless to say, it is of course necessary that the image pick-up light source be estimated with high accuracy. Conventionally, the white balance technique is adopted as the color reproduction correcting method.

On the other hand, a light source of a sunlight type is known for having a high level color-rendering property and a light source of a fluorescent lamp type is known for having a low level color-rendering property. However, there is also a demand for reproducing the image picked up under a light source of a fluorescent lamp type with a color rendering property under a light source of a sunlight type.

However, the white balance is a technique which performs correction to reproduce an achromatic color as it is. Therefore, in a case where the color rendition of the image pick-up light source and that of the observation light source greatly differ, there is a problem that the chromatic colors may not be excellently reproduced by the color reproduction correcting where only the white balance is used.

Also, in a case where a correction coefficient is prepared for every image pick-up light source and observation light source to perform color reproduction correction, there is a problem that the processing must be extremely complicated.

The present invention has been made in view of the above-described problems and an object of the invention is to provide a color reproduction correcting device and a color reproduction correcting method for an image input apparatus, in which colors are excellently reproduced without difficulties even when the image has been reproduced under an observation light source whose color rendering property is different from that of the image pick-up light source.

DISCLOSURE OF THE INVENTION

To attain the above object, according to a first aspect of the invention, in a color reproduction correcting device for an image input apparatus, the color reproduction correcting device performs color reproduction correction with respect to image data of an image picked up by the image input apparatus which outputs information on the type of a image pick-up light source and information containing chromaticity point data of the image pick-up light source, that is information on the estimated result of the image pick-up light source. The color reproduction correcting device includes: white balance matrix production means for receiving the chromaticity point data from the image input apparatus to produce a correction matrix for white balance, light source type determination means for receiving information on the image pick-up light source from the image input apparatus to determine the types of the image pick-up light source and an image color reproduction light source, transformation matrix production means for producing a transformation matrix reflecting the optical characteristics of the picked-up object by using predetermined color matching function data, spectral characteristic data on the image pick-up light source and color reproduction light source determined by the light source type determination means, optical characteristic data on a predetermined picked-up object, and correction matrix data for white balance, and color correction processing means for performing color reproduction correction with respect to the image data by using the transformation matrix.

Further, according to a second aspect of the invention, the color reproduction correcting device in the first aspect of the invention further includes weighted transformation matrix production means for applying a predetermined constant as a weighting factor and calculating a sum of the product of the transformation matrix and the weighting factor and the product of the unit matrix in the same size as that of the transformation matrix and the weighting factor, to produce weighted transformation matrix, and then the color correction processing means uses the weighted transformation matrix as a transformation matrix for color reproduction correction.

Further, according to a third aspect of the invention, the transformation matrix produced in the transformation matrix production means is the matrix to which white balance is applied; and the color correction processing means uses the transformation matrix to which white balance is applied as a transformation matrix for color reproduction correction under the same type of light source.

Further, according to a fourth aspect of the invention, in any one of the first to third aspects of the invention, the optical characteristic data of the picked-up object includes principal component analysis data obtained by that analysis, or colorimetry data obtained by performing colorimetry with respect to a picked-up object whose colors are equally distributed in a color space, and then the color correction processing means uses the transformation matrix produced by the transformation matrix production means which uses the principal component analysis data or the colorimetry data, as the transformation matrix for performing color reproduction correction.

According to a fifth aspect of the invention, in a color reproduction correcting method for a picked-up image by an image input apparatus which outputs information on the type of a image pick-up light source and information containing chromaticity point data of the image pick-up light source, that is information on the estimated result of the image pick-up light source, the color reproduction correcting method comprises the steps of: receiving the chromaticity point data from the image input apparatus to produce a correction matrix for white balance, receiving information on the image pick-up light source from the image input apparatus to determine the types of the image pick-up light source and an image color reproduction light source, producing a transformation matrix which reflects the optical characteristics of the picked-up object by using predetermined color matching function data, spectral characteristic data on the image pick-up light source and color reproduction light source determined by the light source type determination means, optical characteristic data on a predetermined picked-up object, and correction matrix data for white balance, and performing a color correction processing with respect to the image data by using the transformation matrix.

According to a sixth aspect of the invention, the color reproduction correcting method in the fifth aspect of the invention further comprises the step of applying a predetermined constant as a weighting factor and calculating a sum of the product of the transformation matrix and the weighting factor and the product of the unit matrix in the same size as that of the transformation matrix and the weighting factor, to produce weighted transformation matrix, and then the color correction processing step uses the weighted transformation matrix as a transformation matrix for color reproduction correction.

According to a seventh aspect of the invention, in the color reproduction correcting method of the fifth or sixth aspect of the invention, the transformation matrix produced in the transformation matrix production step is the matrix to which white balance is applied; and the color correction processing step uses the transformation matrix to which white balance is applied, as a transformation matrix for color reproduction correction under the same type of light source.

According to an eighth aspect of the invention, in the color reproduction correcting method in any one of the fifth to seventh aspects of the invention, the optical characteristics data of the picked-up object includes principal component analysis data obtained by that analyses or colorimetry data obtained by performing colorimetry with respect to a picked-up object whose colors are equally distributed in a color space, and then the color correction processing step uses the transformation matrix produced by the transformation matrix production step which uses the principal component analysis data or the colorimetry data, as the transformation matrix for performing color reproduction correction.

BEST MODE FOR CARRYING OUT THE INVENTION

First Embodiment

Figure 1:
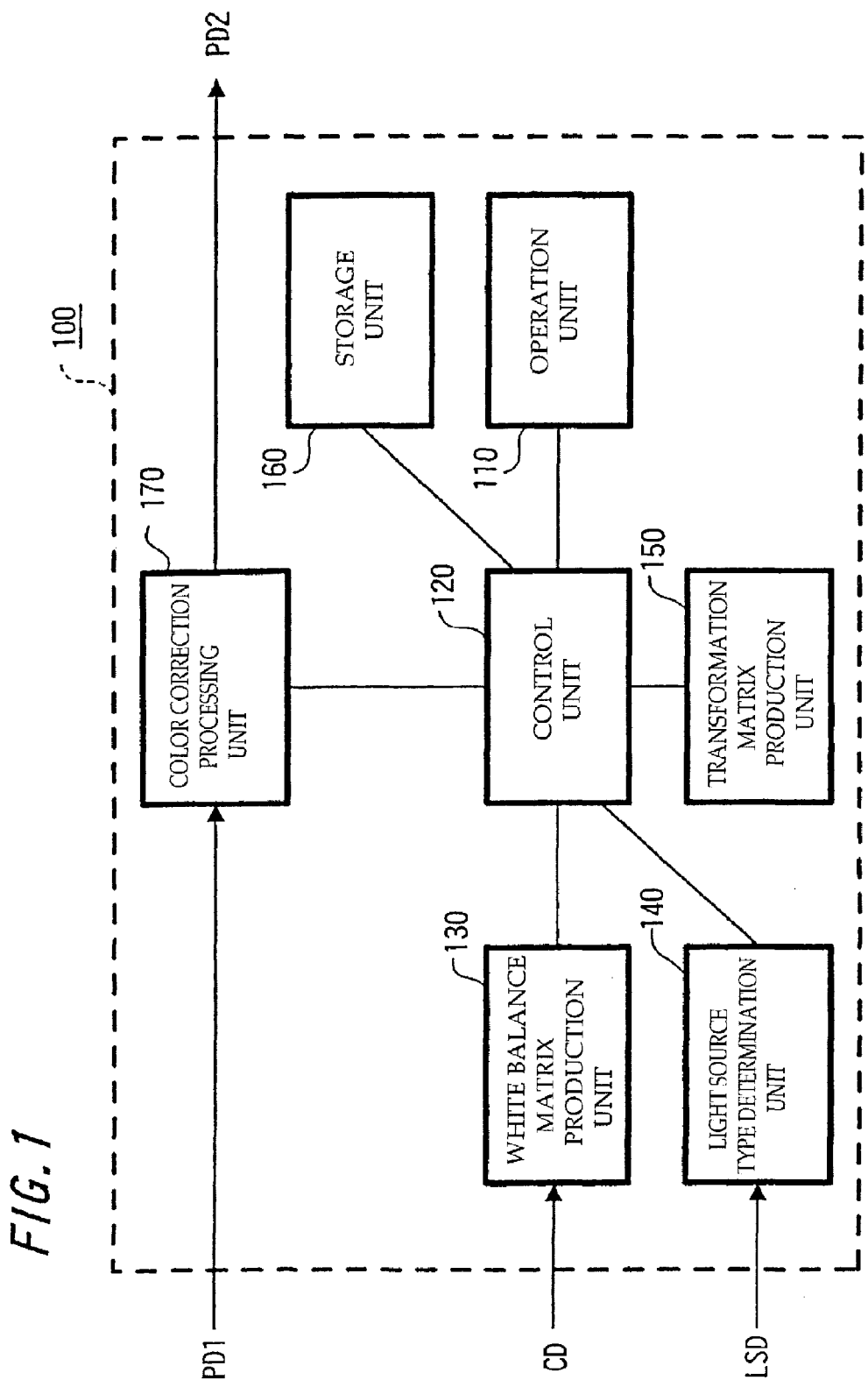
FIG. 1 is a block diagram illustrating the entire configuration of a color reproduction correcting device according to a first embodiment of the present invention.

FIG. 1 is a view illustrating the entire configuration of a color reproduction correcting device according to a first embodiment of the present invention. In FIG. 1, the color reproduction correcting device 100 comprises an operation unit 110, a control unit 120, a white balance matrix production unit 130, a light source type determination unit 140, a transformation matrix production unit 150, storage unit 160, and a color correction processing unit 170. The control unit 120 is connected to each of the other constituent parts and thereby controls those respective parts.

Hereinafter, the operations of the above-described respective units will be explained. The following explanations are based on the premise that estimates light source data LSD and chromaticity point data CD on the estimated light source obtained from the outside are input into the color reproduction correcting device 100, as a result of having estimated the image pick-up light source using a known light source estimation technique. Further, it is assumed that image data PD1 is input to the color reproduction correcting device 100 from the outside while image data PD2 is output from that color reproduction correcting device 100.

The operation unit 110 is equipped with an image monitor (not illustrated) on which a menu screen to perform setting etc. necessary for the color reproduction correction is displayed, and the setting is performed by using keys, or the like, of the operation unit 110. Further, by the operation unit 110, instructions on start, stop, etc. of processing, data input, and the other input are performed. Furthermore, the states of the processing at the respective units, the processed results of them, etc. are displayed on the image monitor. The output of the operation unit 110 is transmitted to the control unit 120, or transmitted to the respective units through the control unit 120.

The control unit 120 performs processing such as outputting predetermined instructions, data, etc. to the respective processing units according to the setting, instructions, data, etc. output from the operation unit 110 and outputting instructions, data, etc. to the other units according to signals output from the respective units to the control unit 120. For example, the control unit 120 performs the following processing such as reading out data from the storage unit 160 as later described in response to a request from the transformation matrix production unit 150 as later described to output data to the transformation matrix production unit 150 and outputting the result being output from the transformation matrix production unit 150 to the color correction processing unit 170, or the like. Further, each time the above-described estimated light source data LSD is input to the white balance matrix production unit 130 and light source type determination unit 140, the control unit 120 controls the respective units to produce and update a transformation matrix for use in color reproduction correction and the control unit 120 controls color reproduction correction using the updated transformation matrix.

According to the instructions from the control unit 120, the white balance matrix production unit 130 receives the chromaticity point data CD on the estimated light source, i.e. (RW, GW, BW), to produce a correction matrix M (WB) for use in white balance according to the following equation (1).

$$M(WB) = \begin{bmatrix} 1/RW & 0 & 0 \\ 0 & 1/GW & 0 \\ 0 & 0 & 1/BW \end{bmatrix} \quad (1)$$

Here, the RW, GW, and BW respectively represent the R (red), G (green), and B (blue) components of the chromaticity points regarding the estimated light source.

According to the instructions from the control unit 120, the light source type determination unit 140 receives the estimated light source data LSD input from the outside to determine the types of the image pick-up light source and observation light source on the basis of the information on the type of the estimated light source and the information on the type of the observation light source obtained through the control unit 120.

As the above-described light source types, there are, for example, a D type (sunlight type), an FB type (high-efficiency fluorescent lamp type), an FP type (three band fluorescent lamp type), and an A type [incandescent lamp (black body radiation) type]. Each type is further classified as follows.

D type (sunlight type): CIE/D50(5003K), D55(5503K), D65 (6504K), D75(4504K), etc.
FE type (high-efficiency fluorescent lamp type): CIE/F1 (6430K), F2(4240K), F3(3450K), F4(2940K), F5(6350K), F6(4150K), etc.
FP type (three band fluorescent lamp type): CIE/F10 (5000K), F11(4000K), F12(3000K), etc.
A type [incandescent lamp (black body radiation) type]: CIE/A(2856K), etc.

According to the instructions from the control unit 120, transformation matrix production unit 150 receives the correction matrix M (WB) from the white balance matrix production unit 130 and also receives the information on the light source types of both the image pick-up light source and observation light source from the light source type determination unit 140. Also, from the storage unit 160 as later described, the transformation matrix production unit 150 receives data such as the color matching function data S, the light source spectral characteristic data Lm and Ln regarding the types of the image pick-up light source and observation light source respectively, and the characteristic matrix data B obtained by performing principal component analyses with respect to the spectral reflectance of the picked-up object, etc. The transformation matrix production unit 150 thereby calculates a matrix A according to the following equation (2).

$$A = S^T \cdot L \cdot B \quad (2)$$

where the L represents the spectral characteristic data of the light source, and when the light source is the image pick-up light source, Lm is used as the L while Ln is used as the L when the light source is the observation light source. Here, the T means the transposition of the matrix. Hereinafter, this matrix A is referred to as "the coefficient matrix A". The produced coefficient matrix A may be stored in the storage unit 160 through the control unit 120, and in the succeeding steps of processing, the stored coefficient matrix A may be used.

As the color matching function data, there are the CIE/1931, etc. Here, as the color matching function, for example, the CIE/1931 color matching function $S=[\underline{x}(\lambda), \underline{y}(\lambda), \underline{z}(\lambda)]$ is used. As this time, the $\underline{x}(\lambda), \underline{y}(\lambda), \underline{z}(\lambda)$ can be expressed by arranging the data items representing the respective x, y, and z components at the wavelength $\lambda=[\lambda 1, \lambda 2, \ldots, \lambda N]$, as follows.

$$\underline{x}(\lambda) = [x(\lambda 1), x(\lambda 2), \ldots, x(\lambda N)]^T$$

$$\underline{y}(\lambda) = [y(\lambda 1), y(\lambda 2), \ldots, y(\lambda N)]^T$$

$$\underline{z}(\lambda) = [z(\lambda 1), z(\lambda 2), \ldots, z(\lambda N)]^T \quad (3)$$

where the T means the transposition of the matrix.

The light source spectral characteristic data L can also be expressed by arranging the data items at the wavelength $\lambda=[\lambda 1, \lambda 2, \ldots, \lambda N]$, as a diagonal matrix of (N×N) shown in the following expression (4).

$$L = \begin{bmatrix} L(\lambda 1) & 0 & \cdots & 0 \\ 0 & L(\lambda 2) & \cdots & 0 \\ \vdots & \vdots & & \vdots \\ 0 & 0 & \cdots & L(\lambda N) \end{bmatrix} \quad (4)$$

In the characteristic matrix B, the most contributory characteristic vectors obtained in the principal component analyses are arranged by the predetermined number Q of characteristic vectors as in the following equation (5).

$$B = [\underline{B1}, \underline{B2}, \ldots \underline{Bk}, \ldots \underline{BQ}] \quad (5)$$

Figure 2:
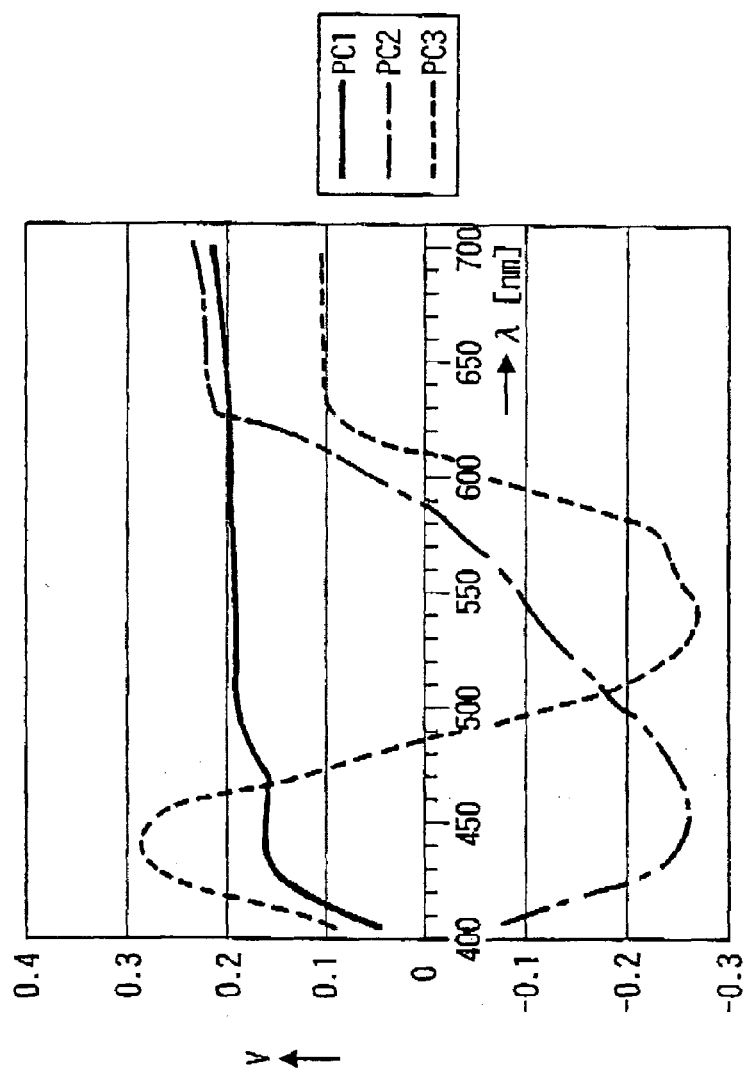
FIG. 2 is a view illustrating an example of the most contributory three characteristic vectors that are obtained in the principal component analyses.

Here, the characteristic vector $\underline{Bk}$ (the k represents one of the integers from 1 to Q) is an N-dimensional row vector and the number Q of the vectors can also be designated, for example, from the operation unit 110. FIG. 2 shows an example of the characteristic vector Bk. The abscissa axis of the illustration represents the wavelength (nm) and the ordinate axis represents the vector values V at the wavelength. In this example, three vectors (PC1, PC2, and PC3) are plotted in the sequential order of contribution, i.e. a case where the number Q of the vectors is 3, is illustrated.

The transformation matrix production unit 150, by using the correction matrix M (WB) received from the white balance matrix production unit 130 and the above-described coefficient matrix A (that may be either the one produced by calculation or the one that was stored in the storage unit 160), produces the transformation matrix M (m→n) according to the following equation (6).

$$M(m \to n) = M(WB)(n) \cdot A(n) \cdot [M(WB)(m) \cdot A(m)]^{-1} \quad (6)$$

where the A (m) represents the coefficient matrix regarding the image pick-up light source and the A (n) represents the coefficient matrix regarding the observation light source.

For example, in a case where a type [m] of the light source is the above-described FE type and a type [n] of the light source is the D type, the calculation examples of the equation (6) and the equation (1) are expressed as in the following equations (7) and (8).

$$M(FE \to D) = M(WB)(D) \cdot A(D) \cdot [M(WB)(FE) \cdot A(FE)]^{-1} \quad (7)$$

$$= \begin{bmatrix} 1.20 & -0.28 & 0.11 \\ -0.06 & 0.88 & 0.19 \\ 0.01 & -0.02 & 1.01 \end{bmatrix}$$

$$A(FE) = S^T \cdot L(FE) \cdot B \quad (8)$$

As shown in this example, it is seen that M (FE→D) is greatly deviated from the unit matrix.

Equally, the calculation examples of the M (m→n) in a case where the type [n] of the light source is the D type, and the type [m] of the light source is the above-described FP type and A type are expressed as in the following expressions (9) and (10) respectively.

$$M(FP \to D) = \begin{bmatrix} 1.06 & -0.13 & 0.10 \\ -0.01 & 0.77 & 0.23 \\ 0.01 & -0.03 & 1.01 \end{bmatrix} \quad (9)$$

$$M(A - D) = \begin{bmatrix} 0.85 & 0.12 & 0.02 \\ -0.04 & 0.88 & 0.16 \\ 0.03 & -0.12 & 1.08 \end{bmatrix} \quad (10)$$

The storage unit 160 stores predetermined items of information according to the control from the control unit 120. The information stored therein includes, among the information input to the control unit 120, predetermined constants and data such as the color matching function data S, the light source spectral characteristic data L corresponding to the types of the light sources, the characteristic matrix data B, the settings on the menu screen of the operation unit 110, the correction matrix M (WB) for white balance produced in the white balance matrix production unit 130, the information on the light source types of the image pick-up light source and observation light source determined in the light source type determination unit 140, the coefficient matrix A and transformation matrix M (m→n) produced in the transformation matrix production unit 150, and the like. It is noted that other data may also be included as the data stored therein.

The color correction processing unit 170 performs color reproduction correction processing with respect to the image data PD1 input from the outside by using the transformation matrix produced in the transformation matrix production unit 150, and then outputs image data PD2 as a result of color reproduction correction. The processing in the color correction processing unit 170 is performed according to the control by the control unit 120 based on the instructions from the operation unit 110. This color reproduction correction processing is performed according to the transformation shown in the following equation (11).

$$[f(R, n), f(G, n), f(B, n)]^T = \quad (11)$$
$$M(m-n) \cdot [f(R, m), f(G, m), f(B, m)]^T$$

Here, the f (R, m), f (G, m), and f (B, m) represent R, G, and B signal components data respectively in the image data (of the light source [m]) before the color reproduction correction, while the f(R, n), f (G, n) and f (B, n) represent R, G, and B signal components data respectively in the image data (of the light source [n]) after the color reproduction correction.

Figure 3:
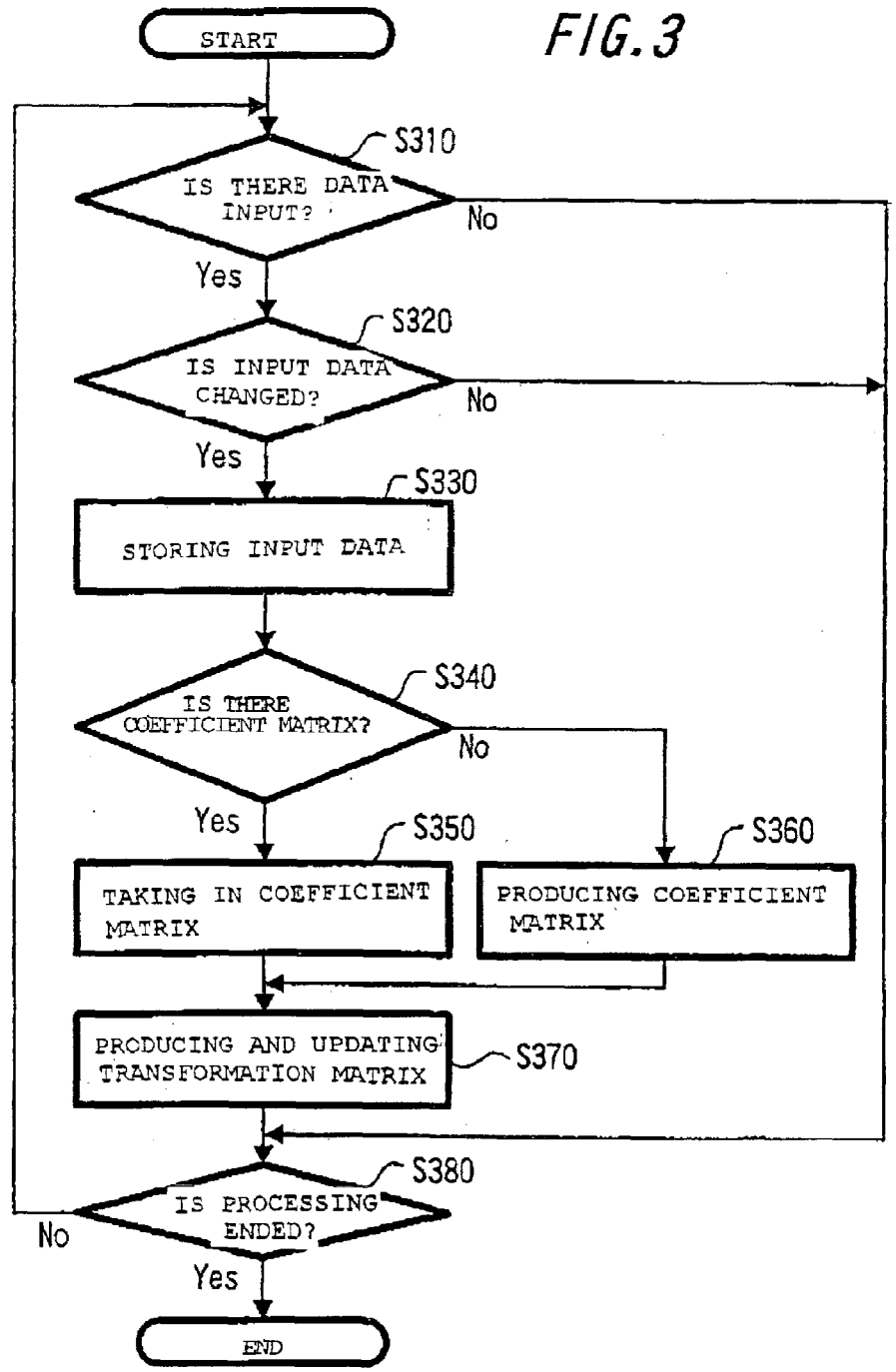
FIG. 3 is a flow chart illustrating the flow of the processing to produce a transformation matrix used in the color reproduction correction of the color reproduction correcting method according to the first embodiment.

Hereinafter, the flow of processing in the color reproduction correcting method according to a first embodiment will be explained. FIG. 3 is a flow chart illustrating the flow of the processing to produce a transformation matrix in the color reproduction correcting method according to the first embodiment of the present invention. In FIG. 3, in step S310 the control unit 120 determines whether the estimated light source data LSD has been newly input to the white balance matrix production unit 130 and the light source type determination unit 140. When it is determined that the estimated light source data LSD has been newly input, the processing proceeds to step S320. When it is determined that the data is not newly input, the processing proceeds to step S380. In step S320, the control unit 120 compares the data newly input to the white balance matrix production unit 130 and light source type determination unit 140 with the data input in the past and being stored in the storage unit 160, to determine whether the newly input data is changed. When it is determined that the newly input data has been updated, the processing proceeds to step S330, while the processing proceeds to step S380 when it is determined that the data is not updated.

In step S330, the control unit 120 causes the newly input data to be stored in the storage unit 160. The storage of the data may be the storage in which the past data is replaced with the newly input data. In step S340, the control unit 120 determines whether the coefficient matrix A is stored in the storage unit 160. When it is determined that the coefficient matrix A is stored in the storage unit 160, the processing proceeds to step S350. When it is determined that the coefficient matrix A is not stored, the processing proceeds to step S360.

When it is determined in step S340 that the coefficient matrix A is stored in the storage unit 160, in step S350, the control unit 120 takes in the coefficient matrix A from the storage unit 160 to output it to the transformation matrix production unit 150. When it is determined in step S340 that the coefficient matrix A is not stored, in step S360, the control unit 120 receives the color matching function data S, the respective light source spectral characteristic data Lm and Ln of the image pick-up and observation light source types, the characteristic matrix data B, etc. from the storage unit 160. The control unit 120 then calculates the matrix A according to the equation (2). Here, needless to say, the light source spectral characteristic data is the data regarding the light source type determined by the light source type determination unit 140. Further, the produced coefficient matrix A may be stored in the storage unit 160.

In step S370, according to the control of the control unit 120, the transformation matrix production unit 150 receives the correction matrix M (WB) from the white balance matrix production unit 130. Then, using the coefficient matrix A obtained in the step S350 or step S360 and the correction matrix M (WB) for white balance, the unit 150 produces the transformation matrix M (m→n) to output it to the control unit 120. The control unit 120 may store that transformation matrix M (m→n) into the storage unit 160. Finally, in step S380, according to the predetermined items of information such as the instructions from the operation unit 110, the control unit 120 determines whether the processing should be ended. When the control unit 120 determines the processing to be ended, the processing will be terminated. When the control unit 120 determines the processing not to be ended, the processing proceeds to the step S310 and the above-described processing is repeated.

Figure 4:
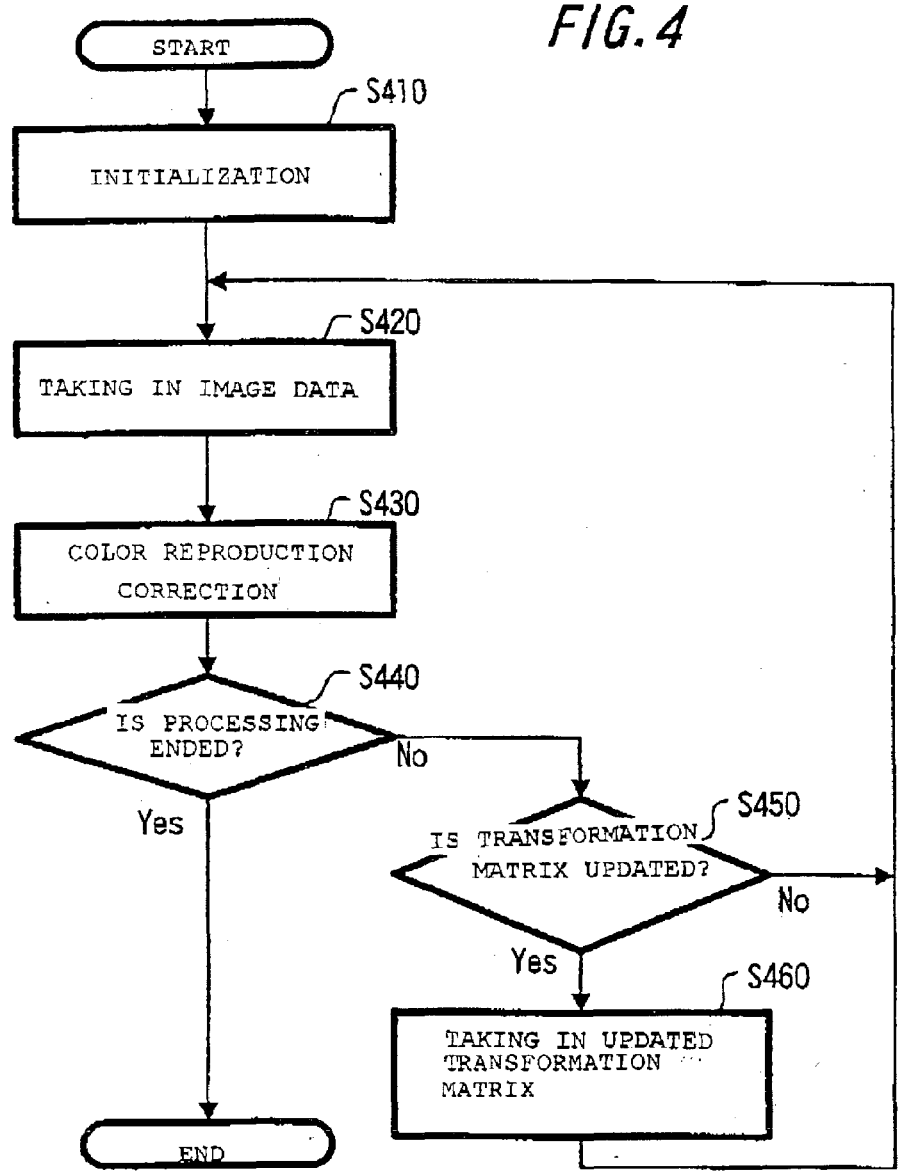
FIG. 4 is a flow chart illustrating the flow of the color reproduction correction processing in the color reproduction correcting method according to the first embodiment.

FIG. 4 is a flow chart illustrating the flow of the color reproduction correction processing in the color reproduction correcting method according to the first embodiment. In FIG. 4, in step S410, the control unit 120 performs predetermined initializations such as taking in the previously determined transformation matrix M (m→n) from the storage unit 160. In step S420, according to the control of the control unit 120, the color correction processing unit 170 takes in the image data from the outside. After taking in a predetermined amount of image data, in step S430, the color correction processing unit 170 performs color reproduction correction according to the above equation (8), and then outputs the color-reproduction corrected image data to the outside.

In step S440, according to the predetermined items of information such as the instructions from the operation unit 110, the control unit 120 determines whether the processing should be ended. When the control unit 120 determines the processing to be ended, the processing is terminated. When the control unit 120 determines the processing not to be ended, the processing proceeds to step S450. In step S450, the control unit 120 determines whether the transformation matrix production unit 150 has produced the transformation matrix M (m→n). That may be determined according to the transformation matrix M (m→n) stored in the storage unit 160. When it is determined that the transformation matrix M (m→n) has been updated, the processing proceeds to step S460 and then the control unit 120 takes in the updated transformation matrix M (m→n) to repeat the step S420 and thereafter-succeeding processing. When it is determined that the transformation matrix M (m→n) has not been updated, the processing proceeds to step 420 to repeat step S420 and thereafter-succeeding processing.

As described above, according to the first embodiment, since the transformation matrix M (m→n) is produced in response to the observation light source or desired color rendition to correct the image data by using that transformation matrix M (m→n), it is possible to realize the color reproduction correcting method and device, capable of reproducing the colors with a desired color rendition in addition to reproducing the colors of the image excellently in the actual observation light source environment in a case where an actual observation light source environment or a desired color rendition is different from that of initially presumed.

Further, since it has been arranged to produce the transformation matrix M (m→n) by using the predetermined number of most contributory characteristic vectors selected from among those vectors obtained by the principal component analyses thereby performing color reproduction correction, it is possible to perform the complex processing of producing the transformation matrix M (m→n) requiring a large amount of memory capacity without difficulties.

Further, combining the color transformation technique and the white balance technique enables a processing step which produces a plurality of transformation matrixes M (m→n) under a light source of the same type to be eliminated and, therefore, it becomes possible to decrease the processing needed to produce the transformation matrixes M (m→n).

Second Embodiment

In the color reproduction correcting device and method therefor according to the first embodiment, the input image data is transformed into image data under a predetermined type of observation light source. However, there is also a case where such a device and method is directed to reproduce the colors of an object viewed under a light source as they are (hereinafter referred to as "the retention of the color appearance"). Specifically, there is a case where such a device and method is directed to reproduce the colors of a picked-up image as they are, even though the image was picked up under a light source with a low color rendition. For that reason, the method using transformation matrix M (m→n) in combination with the unit matrix on the basis of each being weighted is effective in the retention of the color appearance rather than the method using only a predetermined transformation matrix M (m→n). In the second embodiment, there will be described the device and method for performing color reproduction correction by a combined use of the transformation matrix M (m→n) and unit matrix on the basis of each being weighted.

Figure 5:
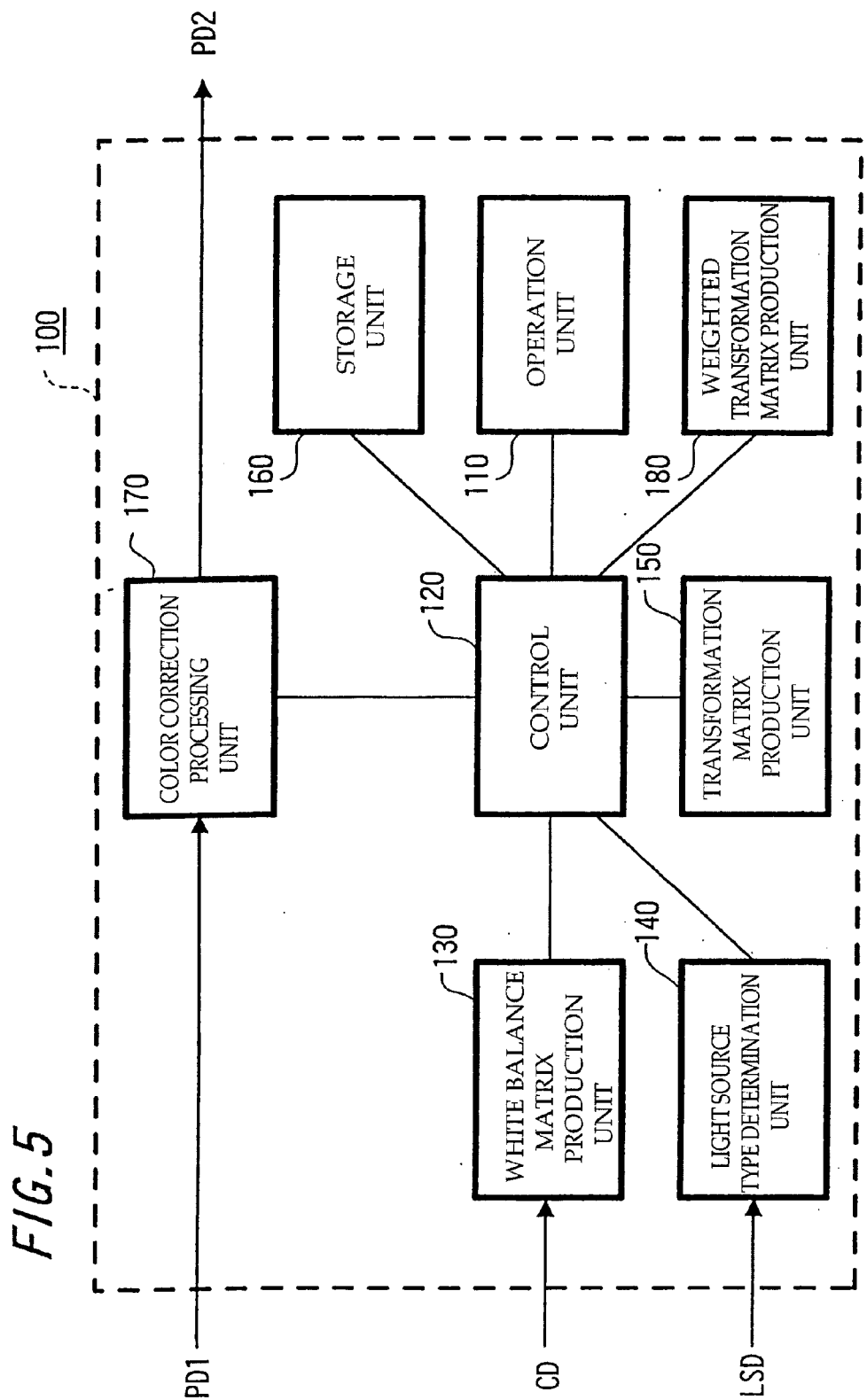
FIG. 5 is a block diagram illustrating the entire configuration of the color reproduction correcting device according to a second embodiment of the present invention.

FIG. 5 is a view illustrating the entire configuration of the color reproduction correcting device 100 according to the second embodiment, wherein a weighted transformation matrix production unit 180 is added to the configuration illustrated in the first embodiment.

In the second embodiment, the operation unit 110 displays predetermined settings in addition to those described in the first embodiment and waits for input on whether the weighted transformation matrix M (m→n) comp is to be produced. When that weighted transformation matrix M (m→n) comp is determined to be produced, the operation unit 110 further waits for input on a weighting factor for every transformation matrix M (m→n). Or it is also possible to store those weighting factors in the storage unit 160 beforehand and to cause one to be selected from among them. Further, other methods are also possible. When there is an input, the information is output to the control unit 120 in which controlling each unit is performed and the information on the weighting factor for every transformation matrix M (m→n) is output to the weighted transformation matrix production unit 180 according to that information. That weighting factor may be stored in the storage unit 160. When it is determined that the weighted transformation matrix M (m→n) comp is to be calculated, the weighted transformation matrix production unit 180 determines the weighting factor for each transformation matrix M (m→n) and the weighting factor for the unit matrix in the same size as the transformation matrix M. Then, the weighted transformation matrix production unit 180 calculates a sum of the product of the transformation matrix and the weighting factor and the product of the weighted transformation matrix M (m→n) comp and the weighting factor to obtain the weighted transformation matrix M (m→n) comp, and outputs it to the control unit 120

Figure 6:
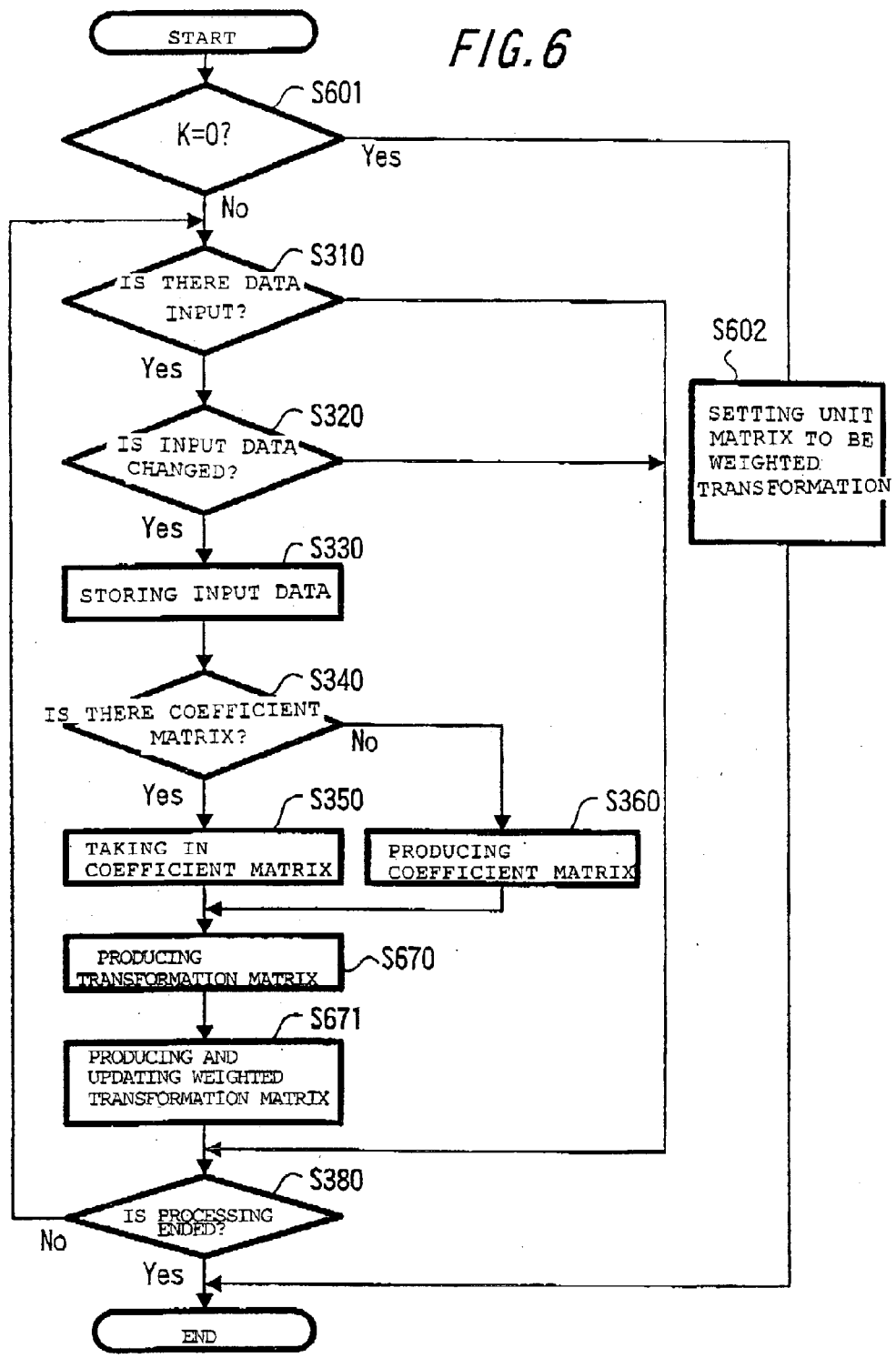
FIG. 6 is a flow chart illustrating the flow of the processing to produce a weighted transformation matrix according to the second embodiment of the present invention.

FIG. 6 is a flow chart illustrating the flow of the processing to produce the weighted transformation matrix M (m→n) comp for use in the color reproduction correction processing in the color reproduction correcting method according to the second embodiment. Hereinafter, with reference to FIG. 6, the flow of the processing to produce the weighted transformation matrix M (m→n) comp will be explained. It is noted that the flow chart illustrating the flow of the color reproduction correction processing using that weighted transformation matrix M (m→n) comp is the same as that illustrated in FIG. 4. In the following explanation, the same processing steps as those in FIG. 3 used in the first embodiment are denoted by the same reference numerals and the explanation relevant thereto is omitted.

In FIG. 6, in step S601, the control unit 120 determines whether the set weighting factor K (hereinafter referred to as "the objective factor") is 0. When it is determined that the K is 0, the processing proceeds to step S602, and when it is determined that the K is not 0, the processing proceeds to step S310. In step S602, the weighted transformation matrix production unit 180 sets the unit matrix as the weighted transformation matrix M (m→n) comp and outputs it to the control unit 120 to end the processing it is assumed that the unit matrix is not changed in the succeeding steps of processing.

In a case where the control unit 120 determines that the K is not 0, the processing from S310 to S360 described in the first embodiment is performed. According to the control of the control unit 120, in step S670, the transformation matrix production unit 150 receives the correction matrix M (WB) from the white balance matrix production unit 130 to produce the transformation matrix (m→n) by using the coefficient matrix A obtained in step S350 or step S360 and the correction matrix M (WB) for white balance. It is noted that, in this second embodiment, the transformation matrix M (m→n) is not output to the control unit 120. Accordingly, the transformation matrix M (m→n) is not stored in the storage unit 160. In step S671, using the above-described objective value, the weighted transformation matrix M (m→n) comp is calculated according to the following equation (12).

$$M(m \rightarrow n)\text{comp} = K \cdot M(m \rightarrow n) + (1-K) \cdot I \quad (12)$$

where the I is the unit matrix in the same size as that of the M (m→n) and, when K=1, there is obtained the transformation matrix K·M (m→n) for changing the light source. When K is 0, there is obtained the transformation matrix for performing the retention of the color appearance (i.e. the unit matrix I).

Finally, according to predetermined information such as instructions from the operation unit 110, the control unit 120 determines whether to terminate the processing in step S380. When the control unit 120 determines that the processing is to be ended, the processing ends. When it determines that the processing is not ended, the processing proceeds to step S310 to repeat the above-described processing.

As described above, according to this second embodiment, since the transformation matrix M (m→n) and the unit matrix are each weighted using the objective factor K, and a sum of those weighted results is calculated to produce the weighted transformation matrix M (m→n) comp, it becomes possible to cope with the user's need, as well, to retain the color appearance without changing the observation light source.

Third Embodiment

The color reproduction correcting method and device in the above-described first embodiment uses the characteristic matrix obtained in the principal component analyses in order to produce the transformation matrix M (m→n). Accordingly, the characteristic matrix depends upon the characteristics of the data used in the principle component analysis, and therefore when some value of bias is in the statistics of that data, it may be considered that the characteristic matrix does not excellently reflect that statistics. In such a case, to enhance the color reproducibility, it is preferable not to produce the transformation matrix using the observation data, but to produce the transformation matrix by the later described method using the data obtained by performing colorimetry on a picked-up object such as a color patch whose colors are equally distributed in a color space. A third embodiment describes the device and method for correcting the color reproduction according to the least-mean square error method on the basis of colorimetry results of the picked-up object whose colors are equally distributed in a color space.

Figure 7:
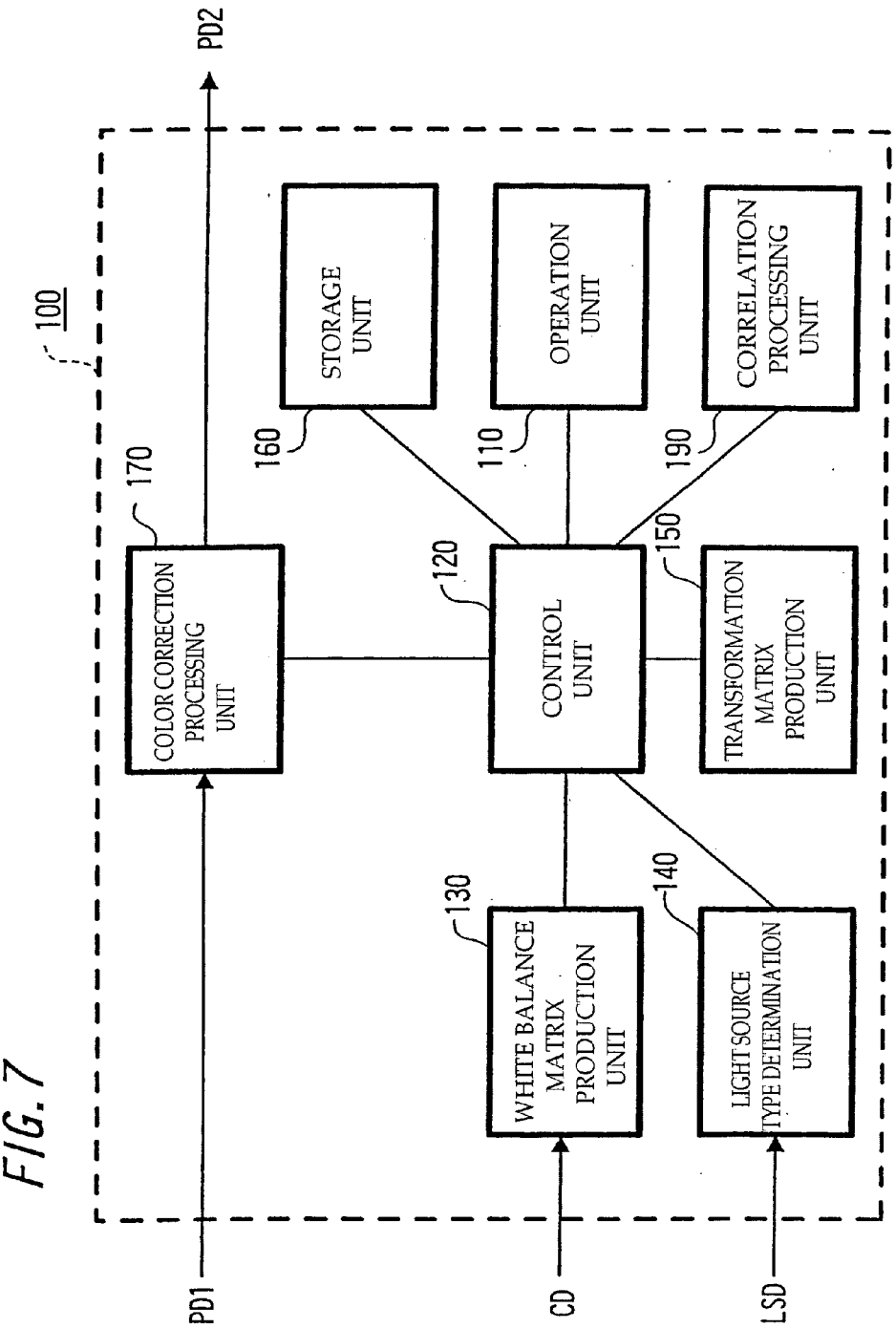
FIG. 7 is a block diagram illustrating the entire configuration of the color reproduction correcting device according to a third embodiment of the present invention.

FIG. 7 is a view illustrating the entire configuration of the color reproduction correcting device according to the third embodiment, wherein a correlation processing unit 190 is added to the configuration illustrated in the first embodiment. The correlation processing unit 190 can be also made detachable as needed.

In this third embodiment, as above described "a picked-up object whose colors are equally distributed in a color space", for example, a color patch is used and colorimetry is performed on CIE 13. 3 basic 8 colors, 14 colors including all colors defined under the CIE 13. 3, GretagMacbeth ColorChecker 24 colors, etc.

The operation unit 110 displays predetermined settings in addition to those in the first embodiment, and waits for input on whether correction using the colorimetry results on the color patch is performed. When there is an input, the information is output to the control unit 120 in which control of the respective units is performed according to that information, and if necessary, the control unit 120 causes a user to select a color patch or the kind of its colors, etc. required for colorimetry through the operation unit 110. The storage unit 160 has stored therein beforehand the information on the color patch and the kind of the colors required for colorimetry, and outputs that information to the correlation processing unit 190 according to the control from the control unit 120.

According to the control of the control unit 120, the correlation processing unit 190 performs colorimetry on the color patch, and then produces the correlation matrix Krr of the spectral reflectance coefficient from the results obtained by colorimetry. Further, according to the following equation (15), the matrix P (A) is produced to be output to the control unit 120.

The transformation matrix production unit 150 receives the matrix P (A) through the control unit 120 and produces the transformation matrix M (m→n) cor according to the following equations (13), (14), and (15).

$$M(m \rightarrow n)\text{cor} = M(WB)(n) \cdot Qn \cdot [M(WB)(m) \cdot Q(m)]^{-1} \quad (13)$$

$$Q = S^T \cdot L \cdot P(A) \quad (14)$$

$$P(A) = Krr \cdot S \cdot (S^T \cdot Krr \cdot S)^{-1} \quad (15)$$

The transformation matrix M (m→n) cor that has been calculated in the transformation matrix production unit 150 is output to the color correction processing unit 170 via the control unit 120. In the color correction processing unit 170, there is performed the color reproduction correction on the input image data by using the transformation matrix M (m→n) cor.

Figure 8:
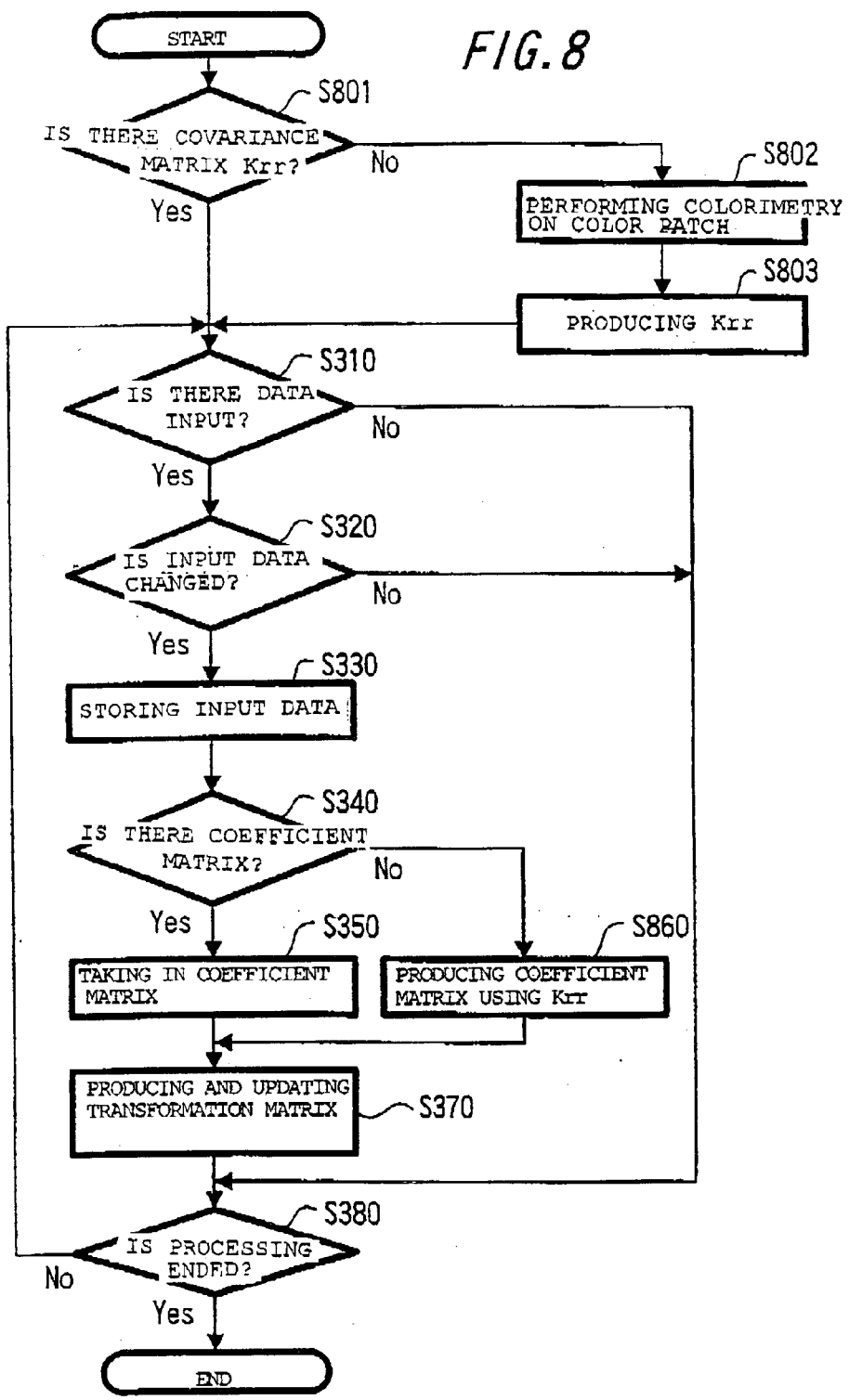
FIG. 8 is a flow chart illustrating the flow of the processing to produce a transformation matrix using the colorimetry data according to the third embodiment of the present invention.

FIG. 8 is a flow chart illustrating the flow of the processing to produce the transformation matrix M (m→n) cor by using the colorimetry data for use in the color reproduction correction processing of the color reproduction correcting method according to the third embodiment. Hereinafter, with reference to FIG. 8, the flow of the processing to produce the transformation matrix M (m→n) cor by using the colorimetry data will be explained. The flow chart illustrating the color reproduction correction processing, using the transformation matrix M (m→n) or produced by using that colorimetry data is the same as that illustrated in FIG. 3. In the following explanation, the same processing as that of FIG. 3 used in the first embodiment is denoted with the same reference numerals and the relevant explanation thereto is omitted.

In FIG. 8, in step S801, the control unit 120 determines whether the covariance matrix Krr of spectral reflectance, which was produced using the colorimetry data of the color patch, is stored in the storage unit 160. When it is determined that the covariance matrix Krr is stored, the processing proceeds to step S310. When it is determined that the covariance matrix Krr is not stored, the processing moves to step S802. The correlation processing unit 190 performs colorimetry on the color patch in step S802, and then in step S803, produces the above-described covariance matrix Krr. The covariance matrix Krr produced at this step may be stored in the storage unit 160. Upon completion of the processing in step S803, the processing proceeds to step S310. In the steps from the step S310 and thereafter, the same processing as that in the first embodiment is performed.

In step S340, the control unit 120 determines whether the coefficient matrix Q is stored in the storage unit 160. When it is determined that such matrix is not stored, in step S860 the control unit 120 receives the color matching function data S, the respective light source spectral characteristic data Lm and Ln regarding the types of the image pick-up light source and the observation light source, etc. from the storage unit 160, thereby the control unit 120 calculating the matrix P (A) according to the above equation (15). Further, the control unit 120, using that result, calculates the coefficient matrix Q according to the above equation (14). Needless to say, the light source spectral characteristic data is the data regarding the light source whose type is determined by the light source type determination unit 140. Further, the coefficient matrix Q produced at this time may be stored in the storage unit 160. The processing after the step S860 is the same as that described in the first embodiment. Additionally, as the method for calculating the above-described covariance matrix Krr, there is, for example, a method of calculating the covariance regarding the respective color component data on the colorimetry result of the color patch and performing transformation with respect thereto using the color matching function data S and the light source spectral characteristic data L. The method of calculating the covariance matrix Krr is known and therefore relevant explanation thereto is omitted.

As described above, according to the third embodiment, it is configured to produce the transformation matrix M (m→n) on the basis of the error least square method, using the result obtained by performing colorimetry on the picked-up object whose colors are equally distributed in a color space. Therefore, it is possible to realize the color reproduction correction which decreases errors due to the bias of the statistics.

As described above, according to the present invention, it is configured to produce the transformation matrix M (m→n) in response to the observation light source or the desired color rendition, and to correct the image data by using that transformation matrix M (m→n). Therefore, even in a case where an actual observation light source environment or a desired color rendition is different from that initially presumed, the image can be excellently color-reproduced in the actual observation light source environment and, simultaneously, the color reproduction correcting method and device capable of color reproducing with a desired color rendition can be realized.

Further, according to the present invention, it is configured to use the predetermined number of most contributory characteristic vectors obtained by the principal component analyses to introduce the transformation matrix M (m→n), thereby performing color reproduction correction. Therefore, it is possible to perform the complicated transformation matrix M (m→n) production processing requiring a large amount of memory capacity without difficulties.

Further, according to the present invention, combining the color transformation technique and the white balance technique enables a processing step which produces a plurality or transformation matrixes M (m→n) under the light source of the same type to be eliminated. Therefore, it is possible to decrease steps of the processing needed to produce the transformation matrix M (m→n).

Further, according to the present invention, it is configured to perform weighting using the objective factor K with respect to each of the transformation matrix M (m→n) and the unit matrix, and to calculate a sum of those weighted matrices to produce the weighted transformation matrix M (m→n) comp. Therefore, it becomes possible to satisfy a user's need to retain the color appearance without changing the observation light source.

Furthermore, according to the present invention, it is configured to produce the transformation matrix M (m→n) on the basis of the error least square method using the result obtained by performing colorimetry on the picked-up object whose colors are equally distributed in a color space. Therefore, it is possible to realize the color reproduction correction capable of decreasing errors due to the bias of the statistics.

The invention claimed is:

1. A color reproduction correcting device for an image data picked up by an image input apparatus which outputs information regarding a type of an image pick-up light source and information containing chromaticity point data of the image pick-up light source, that is to say information on the estimated result of the image pick-up light source, the color reproduction correcting device for an image input apparatus characterized by comprising:

white balance matrix production means for receiving the chromaticity point data from the image input apparatus to produce a correction matrix for white balance;

light source type determination means for receiving information on the image pick-up light source from the image input apparatus to determine the types of an image pick-up light source and an image color reproduction light source;

transformation matrix production means for producing a transformation matrix reflecting the optical characteristics of the picked-up object, using predetermined color matching function data, spectral characteristic data regarding the image pick-up light source and color reproduction light source of the types determined by the light source type determination means, optical characteristic data on a predetermined picked-up object and the correction matrix data for white balance; and color correction processing means for performing color reproduction correction with respect to the image data, using the transformation matrix.

2. The color reproduction correcting device for an image input apparatus according to claim 1, further comprising weighted transformation matrix production means for applying a predetermined constant as a weighting factor and calculating a sum of the product of the transformation matrix and the weighting factor and the product of the unit matrix in the same size as that of the transformation matrix and the weighting factor, to produce a weighted transformation matrix, wherein the color correction processing means uses the weighted transformation matrix as a transformation matrix for color reproduction correction.

3. The color reproduction correcting device for an image input apparatus according to claim 1, wherein
the transformation matrix produced in the transformation matrix production means is the matrix to which white balance is applied; and the color correction processing means uses the transformation matrix to which the white balance is applied as a transformation matrix for color reproduction correction under a light source of the same type.

4. The color reproduction correcting device for an image input apparatus according to claim 2, wherein
the transformation matrix produced in the transformation matrix production means is the matrix to which white balance is applied; and the color correction processing means uses the transformation matrix to which white balance is applied as a transformation matrix for color reproduction correction under the same type of light source.

5. The color reproduction correcting device for an image input apparatus according to claim 1, wherein
the optical characteristic data of the picked-up object includes principal component analysis data obtained by principal component analyses, or colorimetry data obtained by performing colorimetry with respect to a picked-up object whose colors are equally distributed in a color space; and the color correction processing means uses the transformation matrix produced by the transformation matrix production means using the principal component analysis data or the colorimetry data, as the transformation matrix for color reproduction correction.

6. The color reproduction correcting device for an image input apparatus according to claim 2, wherein
the optical characteristic data of the picked-up object includes principal component analysis data obtained by principal component analyses, or colorimetry data obtained by performing colorimetry with respect to the picked-up object whose colors are equally distributed in a color space; and the color correction processing means uses the transformation matrix produced by the transformation matrix production means using the principal component analysis data or the colorimetry data, as the transformation matrix for color reproduction correction.

7. The color reproduction correcting device for an image input apparatus according to claim 3, wherein
the optical characteristic data of the picked-up object includes principal component analysis data obtained by principal component analyses, or colorimetry data obtained by performing colorimetry with respect to the picked-up object whose colors are equally distributed in a color space; and the transformation matrix produced by using the color correction data is used as the transformation matrix for color reproduction correction.

8. The color reproduction correcting device for an image input apparatus according to claim 4, wherein
the optical characteristic data of the picked-up object includes principal component analysis data obtained by principal component analyses, or colorimetry data obtained by performing colorimetry with respect to the picked-up object whose colors are equally distributed in a color space; and the color correction processing means uses the transformation matrix produced by the transformation matrix production means using the principal component analysis data or the colorimetry data, as the transformation matrix for color reproduction correction.

9. A color reproduction correcting method for an image data picked up by an image input apparatus which outputs information on the type of a image pick-up light source and information containing chromaticity point data of the image pick-up light source, that is to say information on the estimated result of the image pick-up light source, the color reproduction correcting method for an image input apparatus, characterized by comprising the steps of:
receiving the chromaticity point data from the image input apparatus to produce a correction matrix for white balance;
receiving the information on the image pick-up light source from the image input apparatus to determine the types of an image pick-up light source and an image color reproduction light source;
producing a transformation matrix reflecting the optical characteristics of the picked-up object, using predetermined color matching function data, spectral characteristic data regarding the image pick-up light source and color reproduction light source, of the types determined by the light source type determination step, optical characteristic data on a predetermined picked-up object and correction matrix data for white balance; and
processing color correction by performing color reproduction correction with respect to the image data, using the transformation matrix.

10. The color reproduction correcting method for an image input apparatus according to claim 9, further comprising the step of producing a weighted transformation matrix by applying a predetermined constant as a weighting factor, and calculating a sum of the product of the transformation matrix and the weighting factor and the product of the unit matrix in the same size as that of the transformation matrix and the weighting factor, to produce a weighted transformation matrix, wherein
the color correction processing step uses the weighted transformation matrix as a transformation matrix for color reproduction correction.

11. The color reproduction correcting method for an image input apparatus according to claim 9, wherein
the transformation matrix produced in the transformation matrix production step is the matrix to which white balance is applied; and the color correction processing step uses the transformation matrix to which white balance is applied as a transformation matrix for color reproduction correction under a light source of the same type.

12. The color reproduction correcting method for an image input apparatus according to claim 10, wherein
the transformation matrix produced in the transformation matrix production step is the matrix to which white balance is applied; and the color correction processing step uses the transformation matrix to which white balance is applied, as a transformation matrix for color reproduction correction under a light source of the same type.

13. The color reproduction correcting method for an image input apparatus according to claim 9, wherein
the optical characteristic data of the picked-up object includes principal component analysis data obtained by principal component analyses, or colorimetry data obtained by performing colorimetry with respect to a picked-up object whose colors are equally distributed in a color space; and the color correction processing step uses the transformation matrix produced by the transformation matrix production step using the principal component analysis data or the colorimetry data, as the transformation matrix for performing color reproduction correction.

14. The color reproduction correcting method for an image input apparatus according to claim 10, wherein
the optical characteristic data of the picked-up object includes principal component analysis data obtained by principal component analyses, or colorimetry data obtained by performing colorimetry with respect to a picked-up object whose colors are equally distributed in a color space; and the color correction processing step uses the transformation matrix produced by the transformation matrix production step using the principal component analysis data or the colorimetry data, as the transformation matrix for performing color reproduction correction.

15. The color reproduction correcting method for an image input apparatus according to claim 11, wherein
the optical characteristic data of the picked-up object includes principal component analysis data obtained by principal component analyses, or colorimetry data obtained by performing colorimetry with respect to a picked-up object whose colors are equally distributed in a color space; and the color correction processing step uses the transformation matrix as the transformation matrix for color reproduction correction.

16. The color reproduction correcting method for an image input apparatus according to claim 12, wherein
the optical characteristic data of the picked-up object includes principal component analysis data obtained by principal component analyses, or colorimetry data obtained by performing colorimetry with respect to a picked-up object whose colors are equally distributed in a color space; and the color correction processing step uses the transformation matrix produced by the transformation matrix production step using the principal component analysis data or the colorimetry data, as the transformation matrix for performing color reproduction correction.

* * * * *